United States Patent Office 2,939,857
Patented June 7, 1960

2,939,857

BAKED ALKYD RESINS BASED ON TRICARBOXYLIC BENZENE ACIDS

Benjamin A. Bolton, Gary, and Richard E. Van Strien, Griffith, Ind., assignors to Standard Oil Company, Chicago, Ill., a corporation of Indiana No Drawing. Filed June 14, 1957, Ser. No. 665,655

8 Claims. (Cl. 260—45.3)

This invention relates to alkyd resins particularly suitable for baked finish surface coating use.

In surface coatings there are many uses wherein materials which dry to form solid films at ordinary atmospheric temperatures are not suitable. The necessary degree of film hardness can be obtained only by the use of materials which must be heated to superatmospheric temperatures in order to form the solid film. Surface coatings obtained by this heating process are known as baked finishes. Simultaneously with the surface hardness requirement a certain amount of flexibility is needed to withstand impact against the surface coating. These characteristics of hardness and flexibility are obtained presently by the use of expensive fatty acids in the preparation of alkyd resins adapted to such use; then these expensive alkyd resins are further modified by being mixed with amino resins prior to application to the surface which is to be coated by baked finishing.

An object of the invention is an alkyd resin suitable for use for baked finishes. Another object is an alkyd resin for baked finish use utilizing relatively inexpensive components. A particular object is an alkyd resin suitable for baked finishes with little or no usage of amino resin. Other objects will become apparent in the course of the detailed description of the invention.

Broadly the alkyd resin of the invention is a polyester condensation reaction product of a monoester of a benzene tricarboxylic acid and a monohydric paraffinic alcohol with a dihydric alcohol. By selection of monohydric alcohol and dihydric alcohol a resin which is suitable for use alone in baked finishes can be obtained. By admixing a predominant amount of alkyd resin of the invention with an amino resin, a relatively cheap material for baked finish use is obtained.

The monoester reactant contains as the acid nucleus a benzene tricarboxylic acid which may be trimellitic acid, trimesic acid or hemimellitic acid. The term "benzene tricarboxylic acid" is to be understood as including the anhydride thereof, namely, trimellitic anhydride and hemimellitic anhydride. Trimellitic anhydride is the preferred acid.

The monohydric paraffinic alcohols which form the monoester reactant may be any one of the paraffinic alcohols containing one hydroxyl group. The lower molecular weight alcohols such as methyl, ethyl, and the various propyl, butyl, amyl and hexyl alcohols may be used. When an alkyd resin having greater flexibility as determined by the Bend Test are desired, the moderate molecular weight alcohols such as octyl, nonyl, and tridecyl are desirable. The higher molecular weight alcohols such as cetyl, ceryl ($C_{26}$), or even melissyl ($C_{30}$) may be used. The various monohydric paraffinic alcohols may be used alone or in admixture. The mixture used may consist of two or more isomers or it may consist of two or more alcohols having a different number of carbon atoms in the molecule.

Particularly suitable are the mixtures of moderate molecular weight monohydric paraffinic alcohols prepared by the Oxo Process. As used herein the Oxo alcohols are the product of the reaction of a mixture of olefins with carbon monoxide and subsequent hydrogenation of the product of the oxoation reaction. Many of these Oxo alcohols are now commercial products; the 8, 9, 10 and 13 carbon atom containing mixture of alcohols derived from a mixture of 7, 8, 9 and 12 carbon atom containing olefin isomers, respectively are available as isooctyl alcohol, nonyl alcohol, decyl alcohol and tridecyl alcohol, respectively.

The monoester may be used as such in preparing the alkyd resin of the invention. However, it is preferred to use the reaction product mixture derived by reacting a benzene tricarboxylic acid with the defined alcohol. The acid and the alcohol may be reacted in the amount needed to produce theoretically the monoester i.e., a mol ratio of alcohol to acid of 1. An excess of alcohol may be used in the reaction; in general not more than about 1.2 mols of alcohol should be used per mol of acid; particularly good results have been obtained using about 10% excess alcohol. The acid and the alcohol are heated to a temperature at which fairly rapid reaction is obtained; temperatures on the order of 200°–350° F. have been found satisfactory for the preparation of the monoester. The acid and alcohol are contacted for a time sufficient to complete the reaction which time will be determined by the alcohol charged, the temperature and the degree of contacting in the particular situation. The entire reaction product mixture consisting of reaction product, unreacted alcohol and possibly some slight amount of unreacted acid is used as the monoester charged to the polyester condensation reaction zone wherein the alkyd resin is prepared. It is to be understood that the excess alcohol may be removed from the reaction product mixture and the ester product only charged to the alkyd resin preparation step.

The defined monoester or defined monoester reaction product mixture is then condensed with a dihydric alcohol under polyester condensation reaction conditions wherein the reactants are heated at an elevated temperature with evolution of water until a resin is produced which is soluble in an inert organic solvent and is of the desired acid number. The dihydric alcohol may be: alkandiol, an aromatic diol, an ether alcohol such as polyalkylene glycols or a diol which contains one or more aromatic nuclei within an alkane or oxy alkane chain. The dihydric alcohol may be a simple one such as ethylene glycol, propylene glycol, or butylene glycol. It may be an ether alcohol such as a polymethylene glycol, polyethylene glycol or polypropylene glycol; for example, diethylene glycol, triethylene glycol, tetraethylene glycol and the corresponding propylene and butylene materials. The ether alcohols may be of very high molecular weight such as those known as the carbowaxes. Particularly suitable for uses wherein no amino resin is to be used are the ether alcohols which are a combination of oxy alkylene and aromatic nuclei with the hydroxyl groups being affixed to alkylene carbon atoms. A particularly suitable material of this type is the dipropylene glycol ether of 2,2'-bis-(p-hydroxyphenyl) propane, which compound is available commercially as bis-phenol A, which compound is available commercially. Another compound of particular interest of this type is the bis-glycol ester of isophthalic acid wherein two ethylene glycol molecules are reacted with isophthalic acid to produce a structure having two free hydroxyl groups with the isophthalic acid nucleus in the center of the molecule. The aromatic diols such as hydroquinone may be used. It is preferred to use aromatic diols which contain alkyl substituents such as octyl hydroquinone. Herein the term "glycol" is intended to mean the simple alkane diols, the simple alkylene ether alcohols and the mixed glycols containing aromatic nuclei within the molecule but not directly containing hydroxyl groups.

The reaction between the defined monoester and the defined dihydric alcohol is a conventional polyester condensation reaction wherein the two di-functional molecules condense to form a high molecular weight resin with evolution of water. The reaction is driven to substantial completion by continuous removal of the water produced and maintenance of the alcohol in the condensation zone through a water trap-condenser arrangement. The condensation reaction is facilitated by using more than the theoretical amount of glycol, satisfactory results have been obtained by using up to about 1.2 mols of dihydric alcohol per mol of monoester or monoester reaction mixture. In general, it is preferred to operate with between about 1.05 and 1.15 mols of dihydric alcohol per mol of defined monoester reactant. In general, the polyester condensation reaction is carried out at elevated temperatures on the order of 350°–500° F. dependent upon the reactants and the time available.

The reaction is continued until the alkyd resin from the polyester condensation reaction has the proper acid no. or has obtained the desired solubility in inert organic solvents. It is to be understood that the condensation reaction may be carried out by the so-called fusion method wherein only the reactants are charged or by the so-called solvent method wherein an inert hydrocarbon solvent such as xylene or naphtha is present.

The alkyd resin product of the condensation reaction is dissolved in a suitable inert organic solvent and is then ready for use for surface coating. The organic solvent may be an aromatic hydrocarbon such as benzene, toluene, and xylene; or it may be a paraffinic hydrocarbon such as naphtha or mineral spirits; or it may be chlorinated such as chlorobenzene; or it may be an oxygenated material such as acetone or cyclohexanone; or it may be a material such as dichloroethyl ether. The type of solvent used will be dependent upon the use to which the resin is to be put.

Instead of utilizing the alkyd resin itself to produce the baked finish surface coating improved hardness and/or flexibility may be imparted thereto by admixing the alkyd resin with an amino resin. The alkyd resin is the predominant member of the resin mixture. The resin mixture is dissolved in an inert organic solvent to form the composition which is to be applied to the surface to be coated.

The amino resins suitable for admixture with the alkyd resin of the invention may be any one of the class of resins based chiefly on urea-formaldehyde and melamine-formaldehyde condensation products. The amino resins particularly suitable for use in baked finishes are discussed at length in "Organic Coating Technology," by Payne, volume 1, chapter 8 (1954). In general, between 20 and 40% of the resin mixture will consist of the defined amino resin.

The alkyd resin-solvent solution or alkyd resin-amino resin solvent solution is applied to the surface to be coated by conventional procedures and then the finish is obtained by heating (baking) the coated surface at a suitable temperature usually between about 200° F. and 450° F.

Alkyd resins of the type claimed herein and the results obtainable therewith as surface coating on metal strips and also results obtainable with mixtures of these alkyd resins and amino resins are set out below. Tables I and II show a summary of the reactants, the product characteristics of the alkyd resin and the characteristics of baked films for various alkyd resins and mixtures.

Table I shows results with alkyd resins produced by esterifying trimellitic anhydride with a commercial isooctyl Oxo alcohol using the stoichiometric amount of materials. In these runs 1 through 9 the alcohol and the acid were heated in a vessel provided with a condenser and a stirrer at a temperature of about 250° F. and one hour. The particular glycol was then added to the flask and the temperature then raised to about 430° F. over a two hour time and held at this temperature for about two additional hours or until the acid no. had reached 15. In all these runs the alkyd resin was dissolved in xylene solvent and the Gardner viscosities and colors determined on the alkyd resin-xylene solution. The xylene solution was used to apply a coating on a metal strip of uniform thickness. The coated strips were baked in an oven for 30 minutes at 300° F.

In another series of runs a mixed resin consisting of 28% of a melamin-formaldehyde resin and the particular alkyd resin was dissolved in xylene and a metal strip having a baked finish was produced.

The film was then permitted to stand for one week and the Sward hardness and bend test and impact resistance determined for the film. In addition to these the film was tested for alkali resistance by applying a drop of 2% aqueous sodium hydroxide solution and a drop of 15% aqueous sodium hydroxide solution. After 24 hours the appearance of the finish and its adherence to the metal strip was tested.

*Table I*

[Alcohol: Isooctyl. Acid: Trimellitic anhydride.]

| Run No | 1 | 2 | 3 | 4 | 5 | 6 | 7 | 8 | 9 |
|---|---|---|---|---|---|---|---|---|---|
| Glycol | Ethylene | 1,3-Butane | | Neopentyl | | Diethylene | | (3) | |
| Alkyd Resin Product Characteristics: | | | | | | | | | |
| Acid No | 12.4 | 16.8 | | 13.6 | | 12.4 | | 19.0 | |
| Percent Solids (Xylene Solvent) | 50 | 50 | | 53 | | 52 | | 49 | |
| Viscosity, Gardner | A | I | | C | | D-E | | I | |
| Color, Gardner | 1 | 6–7 | | 1 | | 1–2 | | 7–8 | |
| Film Characteristics (1): | | | | | | | | | |
| Amino Resin, Percent (2) | 28 | None | 28 | None | 28 | None | 28 | None | 28 |
| Hardness, Sward, 1 week | 25 | 0 | 24 | 2 | 34 | 0 | 14 | 10 | 43 |
| Bend Test, Rod Dia. Inches, passed | ⅛ | | ⅛ | | ¾₆ | | ⅛ | | ⅛ |
| Impact Resistance, Inch-lbs | 15 | | 10 | | 26 | | 64 | | 24 |
| Alkali Resistance— | | | | | | | | | |
| 2% NaOH, 24 hrs | OK | | OK | | OK | | OK | | OK |
| 15% NaOH, 24 hrs | loose | | OK | | OK | | Easily Detached | | OK |

(1) Baked 30 minutes at 300° F.
(2) Commercial melamine-formaldehyde resin.
(3) 75% dipropylene glycol ether of 2,2'-bis-(p-hydroxyphenyl) propane; 25% diethlyene glycol.

Table II

[Acid: Trimellitic anhydride.]

| Run No | 10 | 11 | 12 | 13 | 14 | 15 | 16 |
|---|---|---|---|---|---|---|---|
| Alcohol | n-Amyl[2]/Isooctyl[3] | n-Butyl[3]/Isooctyl[3] | | Isooctyl | | n-Butyl[3]/Isooctyl[3] | |
| Glycol | Propylene | (4) | | (4) | | (5) | |
| Excess Alcohol, Percent | | 10 | | 10 | | 20 | |
| Excess Glycol, Percent | 15 | 10 | | 20 | | 10 | |
| Alkyd Resin Product Characteristics: | | | | | | | |
| Acid No | 33 | 20.6 | | 26.8 | | 15.6 | |
| Percent Solids (Xylene Solvent) | 57 | 57 | | 61 | | 50 | |
| Viscosity, Gardner | P-Q | L | | G | | A | |
| Color, Gardner | 12-13 | 11-12 | | 8-9 | | 6-7 | |
| Film Characteristics[1]: | | | | | | | |
| Amino Resin, Percent[2] | 28 | None | 28 | None | 28 | None | 28 |
| Hardness, Sward, 1 week | 64 | 67 | 76 | 38 | 66 | 17 | 63 |
| Bend Test, Rod Dia | ¾ (F) | | 7/16(F) | | ½(F) | ⅛(P) | ⅛(P) |

[1] Baked 30 minutes at 300° F.
[2] Commercial melamine-formaldehyde resin.
[3] 50% by weight.
[4] Dipropylene glycol ether of 2,2'-bis-(p-hydroxyphenyl) propane.
[5] 75% of (4) and 25% of diethylene glycol.
(F) failed. (P) passed.

The data set out in Table I show that these particular combinations had good Sward hardness and excellent flexibility as determined by the bend test and alkali resistance.

Runs 10-16 are set out in Table II. Run No. 10 was carried out using an equal weight mixture of amyl alcohol and isooctyl alcohol with trimellitic anhydride as the acid. The alcohols and the acid were reacted at 300° F. for one hour. One-hundred fifteen percent of the theoretical of propylene glycol was added to the reaction zone and the temperature raised to 350° F. and held for about four hours when the material in the flask became very viscous. The material was cooled and diluted with xylene to a solids content of 57%. A commercial melamine-formaldehyde resin was added to the solution to produce a mixed resin containing 28% of the commercial resin. The baked film produced using this mixed resin was extremely hard and had satisfactory flexibility for this degree of hardness.

The alkyd resin of Runs 11 and 12 was prepared by using equal amounts of n-butyl alcohol and isooctyl alcohol with trimellitic anhydride; a 10% excess of alcohol was used. The monoester reaction product mixture was condensed with commercial dipropylene glycol ether of 2,2'-bis-(p-hydroxyphenyl) propane in 10% excess. The reaction product was divided and a portion used to prepare a baked finish. The other portion was admixed with commercial melamine-formaldehyde resin to produce a mixture containing 28% of the commercial resin. The data show that this particular alkyd resin gave a baked finish which was virtually as hard as the finish obtained using the mixed resin and of good flexibility.

Runs 13 and 14 utilized the dipropylene ether of 2,2'-bis-(p-hydroxyphenyl)propane and only isooctyl alcohol. Under these conditions the straight alkyd resin was of good hardness but considerably softer than the amino resin containing coating.

Runs 15 and 16 show that the use of a mixture of the 2,2'-bis-(p-hydroxyphenyl)propane material and diethylene glycol markedly reduces the hardness of the film but simultaneously greatly improves the flexibility, as compared to Runs 11 and 12.

Thus having described the invention, what is claimed is:

1. An alkyd resin prepared by (1) reacting a member selected from the class consisting of trimellitic acid, trimesic acid, hemimellitic acid, trimellitic anhydride and hemimellitic anhydride and an alkanol containing from 1 to 30 carbon atoms, in a mol ratio of said alcohol to said member of between 1 and about 1.2, at a temperature on the order of 200° F. and 350° F., (2) reacting the product monoester of step 1 with a glycol in a mol ratio of said glycol to said product monoester of between 1 and about 1.2 at a temperature on the order of 350° F. and 500° F. while continuously withdrawing water of reaction therefrom for a time until a resin is produced which is soluble in organic solvents commonly utilized for alkyd resins.

2. A composition suitable for baked finish surface coatings consisting essentially of (a) alkyd resin of claim 1 as a predominant component, (b) an amino resin selected from the class of urea-formaldehyde and melamine-formaldehyde condensation products, and (c) an organic solvent for said resins.

3. The resin of claim 1 wherein said acid is trimellitic anhydride.

4. The resin of claim 1 wherein said alcohol is isooctyl alcohol.

5. The resin of claim 1 wherein said alcohol is tridecyl alcohol.

6. The resin of claim 1 wherein said glycol is diethylene glycol.

7. The resin of claim 1 wherein said glycol is 1,3-butanediol.

8. The resin of claim 1 wherein said glycol is the dipropylene glycol ether of 2,2'-bis-(p-hydroxyphenyl)propane.

References Cited in the file of this patent

UNITED STATES PATENTS

| | | |
|---|---|---|
| 1,993,828 | Brubaker | Mar. 12, 1935 |
| 2,035,528 | Brubaker | Mar. 31, 1936 |
| 2,469,371 | Colbeth | May 10, 1949 |